United States Patent
Onoda et al.

(10) Patent No.: US 7,121,144 B2
(45) Date of Patent: Oct. 17, 2006

(54) PRESSURE SENSOR HAVING A METAL DIAPHRAGM RESPONSIVE TO PRESSURE

(75) Inventors: Michitoshi Onoda, Toyohashi (JP); Michihiro Makita, Anjo (JP); Takeshi Ninomiya, Obu (JP); Hirokazu Kubo, Kasugai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/019,264

(22) Filed: Dec. 23, 2004

(65) Prior Publication Data

US 2005/0166681 A1    Aug. 4, 2005

(30) Foreign Application Priority Data

Feb. 4, 2004   (JP) .................. 2004-028179

(51) Int. Cl.
*G01F 7/08* (2006.01)
(52) U.S. Cl. ....................................... 73/715
(58) Field of Classification Search ............ 73/715, 73/756, 726
See application file for complete search history.

(56) References Cited

U.S. PATENT DOCUMENTS 4,056,009 A * 11/1977 Sonderegger et al. ......... 73/715
5,436,202 A * 7/1995 Miura ......................... 228/102
5,595,939 A 1/1997 Otake et al.
5,627,321 A * 5/1997 Korhonen et al. ............ 73/715
2002/0020222 A1 2/2002 Schmidt et al.

FOREIGN PATENT DOCUMENTS

JP      A-15-294564    10/2003

OTHER PUBLICATIONS

Notice of Reasons for Rejection from Korean Patent Office issued on Apr. 25, 2006 for the corresponding Korean patent application No. 10-2004-0117260 (a copy and English translation thereof).

* cited by examiner

*Primary Examiner*—Jewel V. Thompson
(74) *Attorney, Agent, or Firm*—Posz Law Group, PLC

(57) ABSTRACT

A pressure sensor is composed of a cylindrical connector case firmly connected to a housing and a pressure-detecting chamber formed between the connector case and the housing. The pressure-detecting chamber is confined by a metal diaphragm, an outer peripheral portion of which is firmly held at a portion connecting the connector case and the housing. A relatively thick ring plate is connected to a mounting surface of the housing, and the outer peripheral portion of the metal diaphragm is sandwiched between the ring plate and a pushing plate placed on and connected to the ring plate. Thus, the pressure-detecting chamber containing a sensing element therein is surely sealed even if the housing is made of a material, such as aluminum, which is different from that of the metal diaphragm.

9 Claims, 3 Drawing Sheets

PRESSURE SENSOR HAVING A METAL DIAPHRAGM RESPONSIVE TO PRESSURE

CROSS-REFERENCE TO RELATED APPLICATION

This application is based upon and claims benefit of priority of Japanese Patent Application No. 2004-28179 filed on Feb. 4, 2004, the content of which is incorporated herein by reference.

BACKGROUND OF THE INVENTION

1. Field of the Invention

The present invention relates to a pressure sensor having a metal diaphragm responsive to pressure to be measured.

2. Description of Related Art

An example of a pressure sensor having a metal diaphragm responsive to pressure is disclosed in JP-A-7-243926. The essence of the pressure sensor is illustrated in FIG. 5 attached hereto. This pressure sensor is a diaphragm-seal type pressure sensor having a connector case J1 and a housing J2 connected to each other for forming a pressure-detecting chamber J5 therebetween. A bottom end of the connector case J1 is inserted into a mounting space J4 of the housing J2, and an upper end of a wall forming the mounting space J4 is staked against a shoulder of the connecting case J1. A ring-weld J9, to which an outer peripheral portion of a metal diaphragm J3 is connected, is sandwiched between the connector case J1 and the housing J2.

A sensing element J6 is disposed in the pressure-detecting chamber J5 enclosed by the metal diaphragm J3. The pressure-detecting chamber J5 is filled with encapsulated liquid J8 for transferring pressure imposed on the metal diaphragm J3 to the sensing element J6. A portion connecting the connector case J1 and the housing J2 is sealed with an O-ring J7. The pressure sensor is connected to a pipe or a block containing fluid therein by a screw formed at a bottom portion of the housing J2. A pressure introduced into the pressure sensor is imposed on the metal diaphragm J3 and detected by the sensing element J6.

To prevent fluid introduced into the pressure sensor from leaking through a portion connecting the ring-weld J9 and the housing J2, the ring-weld J9 and the housing J2 are made of a same material and welded together at a contacting portion J10. In order to obtain a firm welding strength between the ring-weld J9 and the housing J2, both have to be made of the same material, such as carbon steel S15C or SUS.

On the other hand, the pipe or the block to which the pressure sensor is connected is often made of a material such as aluminum. If the housing J2 made of carbon steel is connected to a pipe made of aluminum, a potential difference is generated between two different materials contacting each other. Such a potential difference may be as high as 0.5 volts. It is highly probable that corrosion by battery-effect will occur in the pipe made of aluminum. To avoid such corrosion, it is conceivable to make the housing J2 with the same material, such as aluminum, as the pipe to which the pressure sensor is connected. However, it becomes considerably difficult to weld the ring-weld J9 made of SUS or the like to the housing J2 made of aluminum. This is because the melting point of SUS is considerably higher than that of aluminum. Further, it is very difficult to change the material of the metal diaphragm J3 and the ring-weld J9 to other materials because the material such as SUS or the like is most suitable for these parts to obtain high reliability and strength of the welded portion.

SUMMARY OF THE INVENTIONS

The present invention has been made in view of the above-mentioned problem, and an object of the present invention is to provide an improved pressure sensor having a good sealing structure even if a housing made of a material (such as aluminum) different from that of a metal diaphragm is used.

A sensor housing of a pressure sensor is composed of a cylindrical connector case made of resin and a cylindrical housing made of a material such as aluminum. The connector case and the housing are firmly connected to each other, thereby forming a pressure-detecting chamber therein. The pressure-detecting chamber is confined by a metal diaphragm to which pressure to be detected is applied. A sensing element is disposed in the pressure-detecting chamber, and liquid for transferring the pressure applied to the metal diaphragm to the sensing element is encapsulated in the pressure-detecting chamber. The sensing element outputs an electrical signal according to an amount of the pressure transferred thereto, and the electrical signal is sent to an outside electrical circuit such as an electronic control unit.

The housing has a mounting surface on which a bottom end of the connector case is mounted. On the mounting surface a relatively thick ring plate is placed and connected to the mounting surface by welding or the like. A pushing plate is positioned on the ring plate, and an outer peripheral portion of the metal diaphragm is sandwiched between the ring plate and the pushing plate. The three components, i.e., the ring plate, the metal diaphragm and the pushing plate are all made of a same or similar material such as carbon steel and are firmly connected to one another by laser welding or the like. Thus, the metal diaphragm for confining the pressure-detecting chamber is firmly held between the connector case and the housing.

One or more circular projections may be formed on the mounting surface or on a surface of the ring plate facing the mounting surface. The ring plate may be connected to the mounting surface via the circular projections by resistance welding. A circular groove may be formed underneath the mounting surface, so that the pressure to be detected enters into the circular groove to push upward the mounting surface toward the pushing plate.

The relatively thick ring plate is connected to the mounting surface, and the outer peripheral portion of the metal diaphragm is firmly held between the ring plate and the pushing plate positioned on the ring plate. Therefore, the pressure-detecting chamber is surely sealed, even if the housing is made of a material, such as aluminum, different from the material of the metal diaphragm.

Other objects and features of the present invention will become more readily apparent from a better understanding of the preferred embodiments described below with reference to the following drawings.

DETAILED DESCRIPTION OF THE PREFERRED EMBODIMENTS

Figure 1:
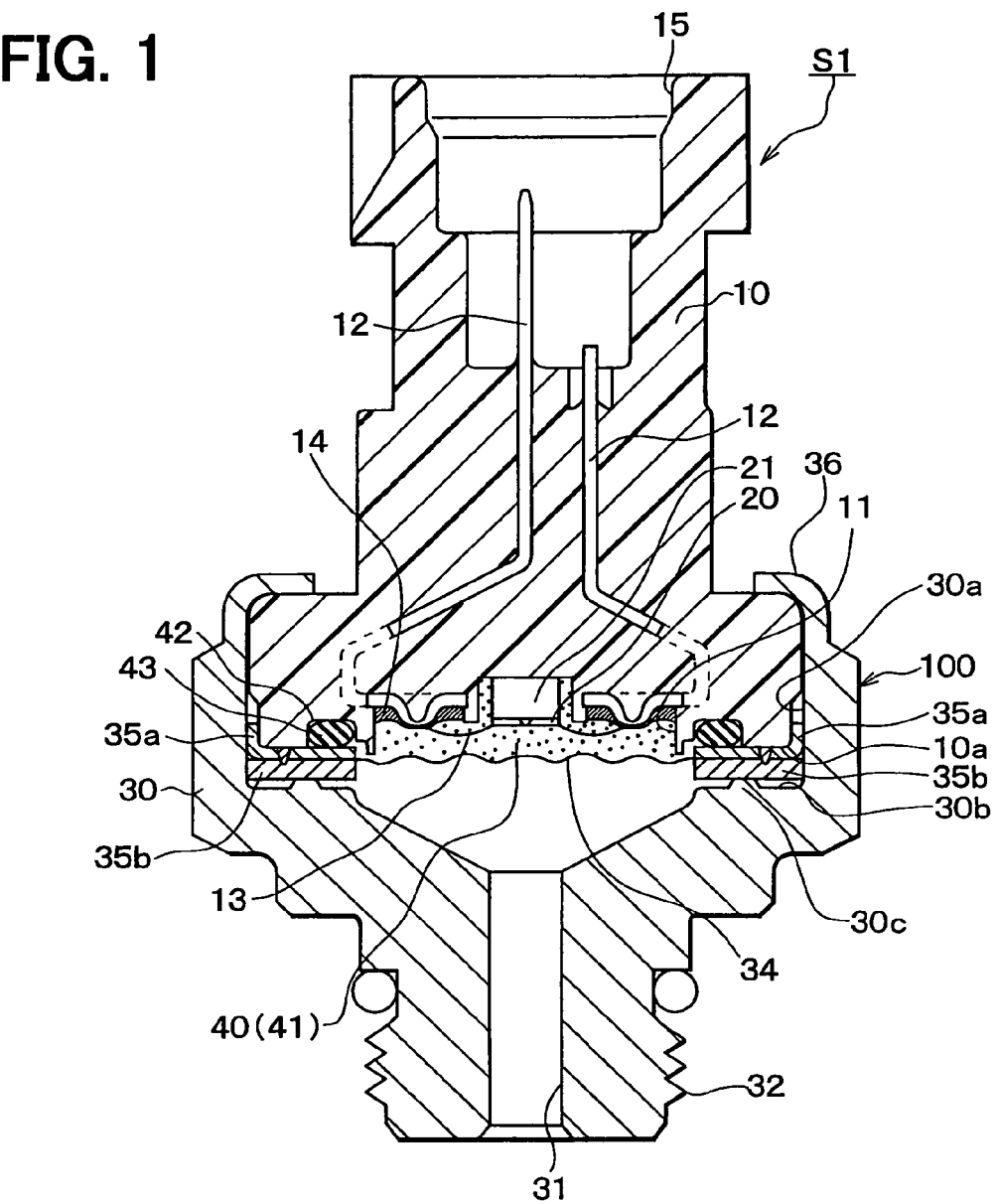
FIG. 1 is a cross-sectional view showing a pressure sensor as a first embodiment of the present invention.

A first embodiment of the present invention will be described with reference to FIG. 1. A pressure sensor S1 shown in FIG. 1 is used, e.g., as a pressure sensor for detecting a pressure of refrigerant in a refrigerant pipe of an air-conditioner system mounted on an automotive vehicle. A sensor casing 100 is formed by connecting a connector case 10 (as a first casing) and a housing 30 (as a second casing). A pressure-detecting chamber 40 is formed between the connector case 10 and the housing 30, and a sensor element 20 is disposed in the pressure-detecting chamber 40.

The connector case 10 is substantially cylindrer-shaped and is made of a resin material such as polyphenylene sulfide (PPS) or polybutylene terephthalate (BBT). The cylindrical connector case 10 has a bottom end 10a on which a depressed portion 11 is formed. A sensing element 20 is disposed in the depressed portion 11. The sensing element 20 has a diaphragm on which a gauge resistor is formed. A pressure applied to the diaphragm is converted into an electrical signal which is used as a sensor signal. The sensing element 20 is connected to a substrate 21 made of glass by anode-connection or the like, and the substrate 21 is connected to the bottom surface of the depressed portion 11.

Terminal leads 12 for electrically connecting the sensing element 20 to an outside circuit are molded together in the resin casing 10. The terminal lead 12 is made of a brass wire plated with nickel or the like. A bottom end of each terminal lead 12 sticks out from the bottom surface of the depressed portion 11, and an upper end thereof is exposed in an opening 15 of the connector case 10. The bottom end of each terminal lead 12 is electrically connected to the sensing element 20 with a bonding wire 13 made of gold or aluminum. Gaps between the terminal leads 12 and the connector case 10 are sealed by a sealing material 14 such as silicone resin. The upper opening 15 of the connector case 10 forms a connector for connecting the terminal leads 12 to the outside circuit such as an electronic control unit mounted on a vehicle.

The housing 30 has a mounting space 30a in which the bottom end of the connector case 10 is inserted. The housing 30 is made of a light metal, such as aluminum or Duralumin, which is the same material as the material of a pipe or block to which the pressure sensor S1 is to be connected. The housing 30 has a pressure-introducing hole 31 through which the pressure to be detected is introduced and a screw 32 for connecting the pressure sensor S1 to the pipe or the block.

As shown in FIG. 1, the housing 30 includes a mounting surface 30b that forms a bottom surface of the mounting space 30a. A ring plate 35b is placed on the mounting surface 30b and connected to the mounting surface 30b by welding via a circular projection 30c circularly formed on the mounting surface 30b. A pushing plate 35a is placed on the ring plate 35b, and an outer peripheral portion of a metal diaphragm 34 is sandwiched between the ring plate 35b and the pushing plate 35a. The pushing plate 35a, the outer peripheral portion of the metal diaphragm 34 and the ring plate 35b are connected together by welding.

The metal diaphragm 34 is made of, e.g., SUS-630 or the like, and the pushing plate 35a is made of, e.g., SUS-316L or the like. The ring plate 35b is preferably made of SUS-316L or carbon steel. It is also possible to make the ring plate 35b with a clad material of SUS and aluminum, or a clad material of iron and aluminum. The thickness of the ring plate 35b is thicker than that of the metal diaphragm 34, i.e., thicker than 0.3 mm. Preferably, the thickness of the ring plate 35b is set to a range from 1.0 mm to 1.5 mm.

The ring plate 35b is connected to the mounting surface 30b by resistance-welding via the circular projection 30c formed circularly on the mounting surface 30b. Therefore, the ring plate 35b is firmly connected to the mounting surface 30b. An upper end 36 of a wall forming the mounting space 30a is staked against the shoulder of the connector case 10, as shown in FIG. 1. Thus, the connector case 10 and the housing 30 are firmly connected to each other.

The pressure-detecting chamber 40 is formed in the depressed portion 11 of the connector case 10, enclosed or confined by the metal diaphragm 34. A pressure-transferring liquid 41 such as fluorine oil is encapsulated in the pressure-detecting chamber 40, so that the encapsulated liquid 41 covers the sensing element 20 and the bonding wires 13. The pressure introduced through the pressure-introducing hole 31 is imposed on the metal diaphragm 34. The pressure is transferred from the metal diaphragm 34 to the sensing element 20 via the encapsulated liquid 41. Electric signals representing the pressure detected by the sensing element 20 are lead out to the outside circuit through the bonding wires 13 and the terminal leads 12. A circular groove 42 is formed on the bottom end 10a of the connector case 10, and an O-ring 43 is disposed in the circular groove 42 to hermetically seal the pressure-detecting chamber 40.

A process of manufacturing the pressure sensor S1 will be briefly explained. First, the connector case 10 having the terminal leads 12 molded therein is prepared. The substrate 21 carrying the sensing element 20 thereon is connected to the bottom surface of the depressed portion 11 with adhesive such as silicone resin. Then, the sealing material 14 is supplied to the depressed portion 11 to reach the bottom surface of the depressed portion 11. The surface of the sensing element 20 is kept free from the sealing material 14. Then, the sealing material 14 is cured, and the sensing element 20 is electrically connected to the terminal leads 12 by the bonding wires 13. Then, the pressure-transferring liquid 41 is supplied to the depressed portion 11 while keeping the connector case so that the depressed portion is positioned upside.

On the other hand, the ring plate 35b is placed on the mounting surface 30b of the housing 30, and the ring plate 35b is connected to the mounting surface 30b by welding via the circular projection 30c. Then, the pushing plate 35a is placed on the ring plate 35b, and the outer peripheral portion of the metal diaphragm 34 is sandwiched between the ring plate 35b and the pushing plate 35a. Then, the three components, i.e., the pushing plate 35a, the metal diaphragm 34 and the ring plate 35b are connected together by laser welding or the like. Since these three components are made of the same or the similar material, they are easily and firmly connected by welding.

Then, the housing 30 is coupled to the connector case 10 from the upside of the connector case 10 while disposing the O-ring between the connector case 10 and the housing 30. Then, the entire body is placed in a vacuum chamber to suck air contained in the entire body. Then, the housing 30 is further pushed against the connector case 10 while pressing the O-ring 43 to seal the pressure-detecting chamber 40. Finally, the end portion 36 of the housing 30 is staked toward the shoulder of the connector case 10, thereby firmly connecting the connector case 10 and the housing 30 together.

The pressure sensor S1 operates in the following manner. The pressure sensor S1 is connected to a pipe or a block containing fluid therein. The fluid is introduced into the pressure sensor S1 through the pressure-introducing hole 31, and the pressure of the fluid is imposed on the metal diaphragm 34. The pressure imposed on the metal diaphragm 34 is transferred to the sensing element 20 via the encapsulated liquid 41. The pressure is detected by the sensing element 20, and an electric signal corresponding to the detected pressure is outputted form the sensing element 20. The signal is sent to the outside circuit such as an electronic control unit through the terminal leads 12.

Since the ring plate 35b, which is relatively thick, is connected to the mounting surface 30b by welding to the circular projection 30c, the ring plate 35b can be firmly connected to the housing 30, even if the material of the ring plate 35b is different from that of the housing 30. Both can be firmly connected if the ring plate 35b is made of a ferrous material such as steel while the housing 30 is made of aluminum. Since the metal diaphragm 34, the pushing plate 35a and the ring plate 35b are all made of the same or the similar material, they can be easily and firmly connected by welding, providing the pressure-detecting chamber 40 with a good seal.

Figure 2:
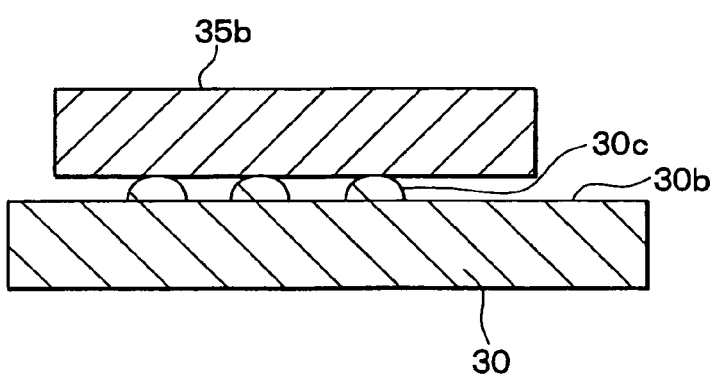
FIG. 2 is a cross-sectional view showing a conceptual structure of projections formed on the housing, as a modified form of the first embodiment.
Figure 3:
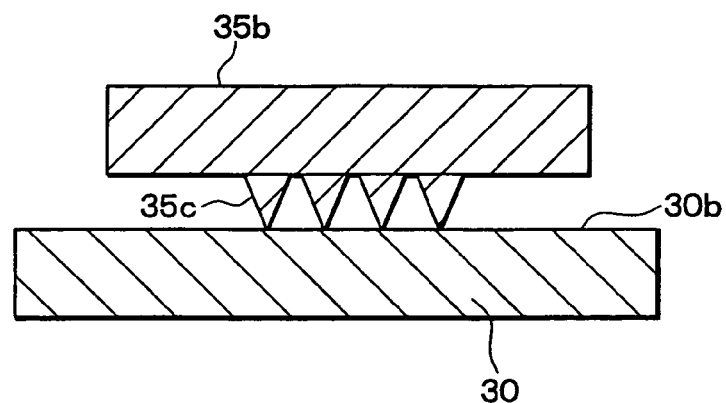
FIG. 3 is a cross-sectional view showing a conceptual structure of projections formed on a ring plate, as a second embodiment of the present invention.

The circular projection 30c formed on the mounting surface 30b of the housing 30 is not limited to one, but plural circular projections 30c may be formed as shown in FIG. 2. A second embodiment of the present invention is shown in FIG. 3. In this embodiment, circular projections 35c are formed on the ring plate 35b in place of the circular projections 30c formed on the mounting surface 30b. The ring plate 35b is connected to the mounting surface 30b by welding via the circular projections 35c. The circular projection 35c is triangle-shaped in FIG. 3, but it may be differently shaped.

Figure 4:
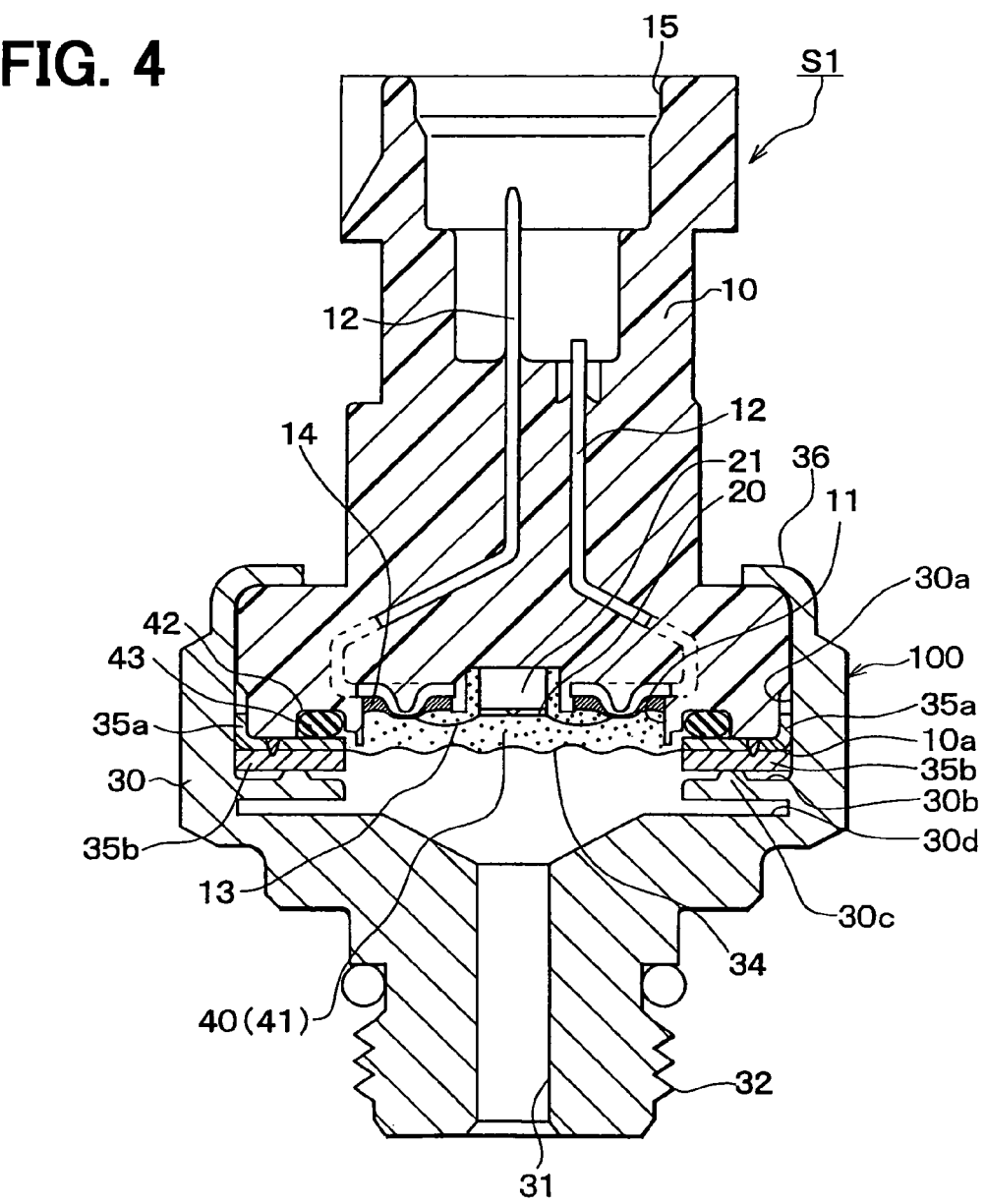
FIG. 4 is a cross-sectional view showing a pressure sensor as a third embodiment of the present invention.
Figure 5:
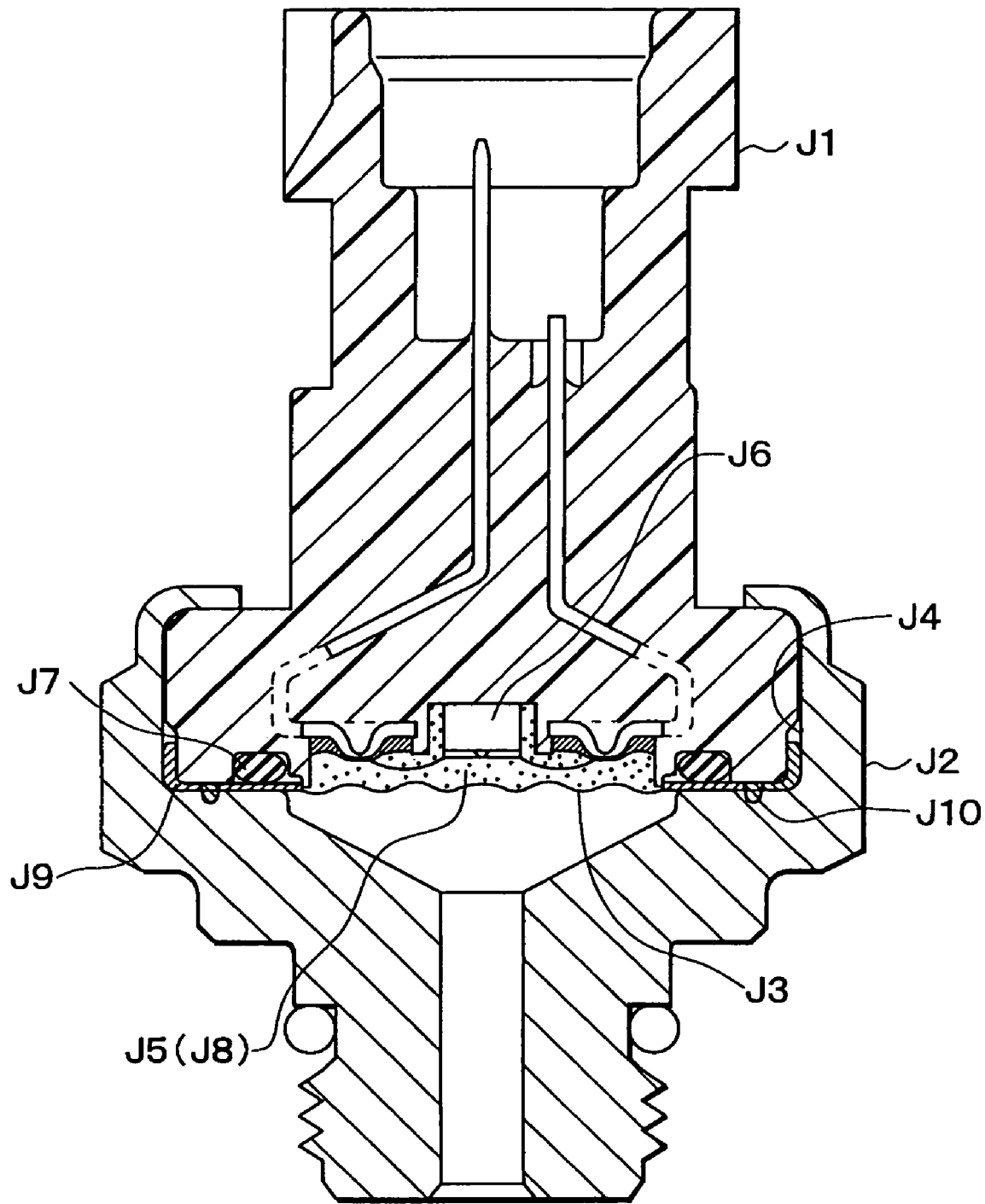
FIG. 5 is a cross-sectional view showing a conventional pressure sensor.

A third embodiment of the present invention is shown in FIG. 4. In this embodiment, a circular groove 30d is additionally formed underneath the mounting surface 30b of the housing 30. Other structures are the same as those of the first embodiment. The pressure to be measured is applied also to the circular groove 30d, and this pressure acts as a force pushing upward the mounting surface 30b. Therefore, the force connecting the ring plate 35b and the mounting surface 30b is enhanced by the pressure.

The present invention is not limited to the embodiments described above, but it may be variously modified. For example, the ring plate 35b may be connected to the mounting surface 30b by heat generated by abrasion. Both may be mechanically connected by staking or the like. The encapsulated liquid 41 such as silicone oil may be replaced with a gaseous material or other materials that are able to transfer pressure.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A pressure sensor comprising:
    a connector case having an upper end and a bottom end, a depressed portion being formed on the bottom end;
    a housing having a mounting surface, the housing being firmly connected to the connector case so that the mounting surface faces the bottom end of the connector case, thereby forming a unitary body of a sensor casing;
    a ring plate mounted on and connected to the mounting surface of the housing;
    a pushing plate contacting the bottom end of the connector case;
    a metal diaphragm responsive to pressure applied thereto, an outer peripheral portion of the metal diaphragm being sandwiched between the ring plate and the pushing plate, wherein the ring plate, the pushing plate and the outer peripheral portion of the metal diaphragm are firmly connected to one another;
    a pressure-detecting chamber formed in the depressed portion of the connector case, confined by the metal diaphragm; and
    a sensing element disposed in the pressure-detecting chamber so that pressure applied to the metal diaphragm is detected by the sensing element.

2. The pressure sensor as in claim 1, wherein:
    a thickness of the ring plate is thicker than 0.3 mm.

3. The pressure sensor as in claim 1, wherein:
    a thickness of the ring plate is in a range from 1.0 mm to 1.5 mm.

4. The pressure sensor as in claim 1, wherein:
    a circular projection is formed on the mounting surface, and the ring plate is connected to the circular projection.

5. The pressure sensor as in claim 1, wherein:
    a circular projection facing the mounting surface of the housing is formed on the ring plate, and the mounting surface is connected to the circular projection.

6. The pressure sensor as in claim 4, wherein:
    a plurality of the circular projections are formed on the mounting surface.

7. The pressure sensor as in claim 5, wherein:
    a plurality of circular projections are formed on the ring plate.

8. The pressure sensor as in claim 1, wherein:
    a circular groove is formed underneath the mounting surface of the housing, so that the mounting surface is pushed upward toward the ring plate by the same pressure applied to the metal diaphragm.

9. The pressure sensor as in claim 1, wherein:
    pressure-transferring liquid is encapsulated in the pressure detecting chamber.

* * * * *